United States Patent
Turner et al.

(10) Patent No.: US 9,892,662 B2
(45) Date of Patent: Feb. 13, 2018

(54) ADHESIVE LABEL ASSEMBLY

(71) Applicant: Saxon, Inc., Ferndale, MI (US)

(72) Inventors: James F. Turner, Farmington Hills, MI (US); Scott D. Best, Troy, MI (US)

(73) Assignee: SAXON INC., Ferndale, MI (US)

( * ) Notice: Subject to any disclaimer, the term of this patent is extended or adjusted under 35 U.S.C. 154(b) by 274 days.

(21) Appl. No.: 14/718,969

(22) Filed: May 21, 2015

(65) Prior Publication Data

US 2015/0339956 A1  Nov. 26, 2015

Related U.S. Application Data

(60) Provisional application No. 62/001,319, filed on May 21, 2014.

(51) Int. Cl.
*B32B 7/12* (2006.01)
*G09F 3/00* (2006.01)
(Continued)

(52) U.S. Cl.
CPC .............. *G09F 3/0288* (2013.01); *B32B 7/06* (2013.01); *B32B 7/12* (2013.01); *B32B 27/10* (2013.01); *B32B 27/36* (2013.01); *B32B 43/006* (2013.01); *B65C 1/02* (2013.01); *G09F 3/10* (2013.01); *B32B 37/18* (2013.01); *B32B 38/10* (2013.01); *B32B 2038/045* (2013.01); *B32B 2255/12* (2013.01); *B32B 2255/26* (2013.01); *B32B 2439/62* (2013.01); *B32B 2519/00* (2013.01); *G09F 2003/022* (2013.01); *G09F 2003/0202* (2013.01); *G09F 2003/0208* (2013.01); *G09F 2003/0216* (2013.01); *G09F 2003/0222* (2013.01); *G09F 2003/0255* (2013.01); *G09F 2003/0257* (2013.01); *G09F 2003/0272* (2013.01); *Y10T 428/14* (2015.01);
(Continued)

(58) Field of Classification Search
CPC ............ G09F 3/0288; B32B 7/06; B32B 2/12
See application file for complete search history.

(56) References Cited

U.S. PATENT DOCUMENTS 5,686,159 A  11/1997  Langan
5,884,425 A  3/1999  Baldwin
(Continued)

FOREIGN PATENT DOCUMENTS

WO  WO 2013/024283 A1  2/2013

OTHER PUBLICATIONS

Price Chopper, "Price Chopper Wristbands Blog", http://www.pchopper.com/wristbands-blog/paper-wristbands-for-event-admission, Posted Oct. 4, 2013; accessed Apr. 1, 2015, pp. 1-3.

*Primary Examiner* — Victor S Chang
(74) *Attorney, Agent, or Firm* — Howard & Howard Attorneys PLLC

(57) ABSTRACT

An assembly includes a base layer, a top layer spaced from the base layer, a top layer adhesive disposed on an interior surface of the top layer, a liner sandwiched between the top and base layers, and a liner adhesive disposed on a second surface of the liner. The top layer, the liner, and a portion of the base layer collectively define a primary label removable from a remaining portion of the base layer. The primary label has a body section defined by a portion of the top layer and a portion of the liner and a tab section defined by a remaining portion of the top layer, a remaining portion of the liner, and the portion of the base layer covering the liner adhesive of the remaining portion of the liner.

17 Claims, 10 Drawing Sheets

(51) Int. Cl.

| | |
|---|---|
| *G09F 3/10* | (2006.01) |
| *B32B 7/06* | (2006.01) |
| *B65C 1/02* | (2006.01) |
| *B32B 43/00* | (2006.01) |
| *B32B 27/10* | (2006.01) |
| *B32B 27/36* | (2006.01) |
| *B32B 37/18* | (2006.01) |
| *B32B 38/10* | (2006.01) |
| *G09F 3/02* | (2006.01) |
| *B32B 38/04* | (2006.01) |

(52) U.S. Cl.
CPC .... *Y10T 428/1476* (2015.01); *Y10T 428/1486* (2015.01); *Y10T 428/1495* (2015.01)

(56) References Cited

U.S. PATENT DOCUMENTS

| | | |
|---|---|---|
| 5,976,014 A | 11/1999 | Petrick et al. |
| 6,220,633 B1 | 4/2001 | Van Boom et al. |
| 7,246,823 B2 | 7/2007 | Laurash et al. |
| 7,766,240 B1 | 8/2010 | Grant |
| 8,128,000 B2 | 3/2012 | Forster |
| 8,496,110 B2 | 7/2013 | Raming |
| 8,678,289 B2 | 3/2014 | Roseman |

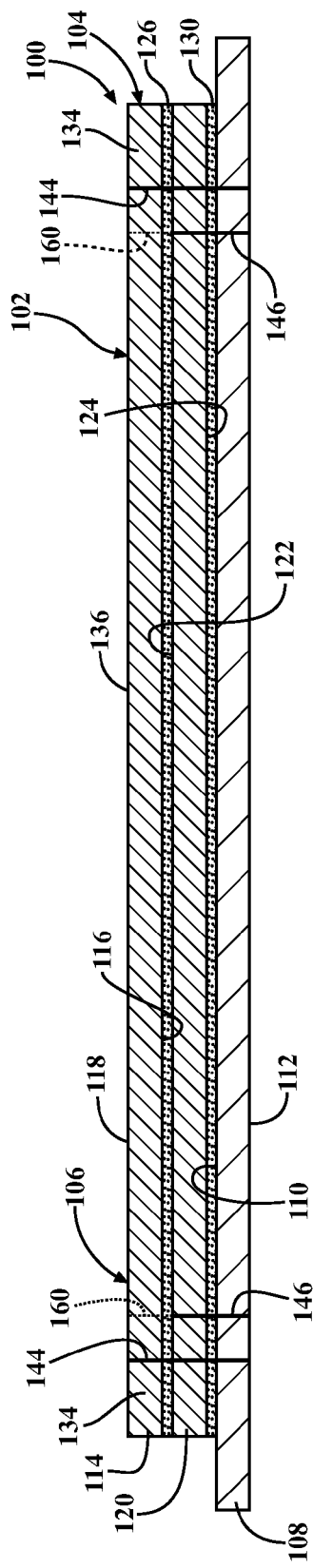
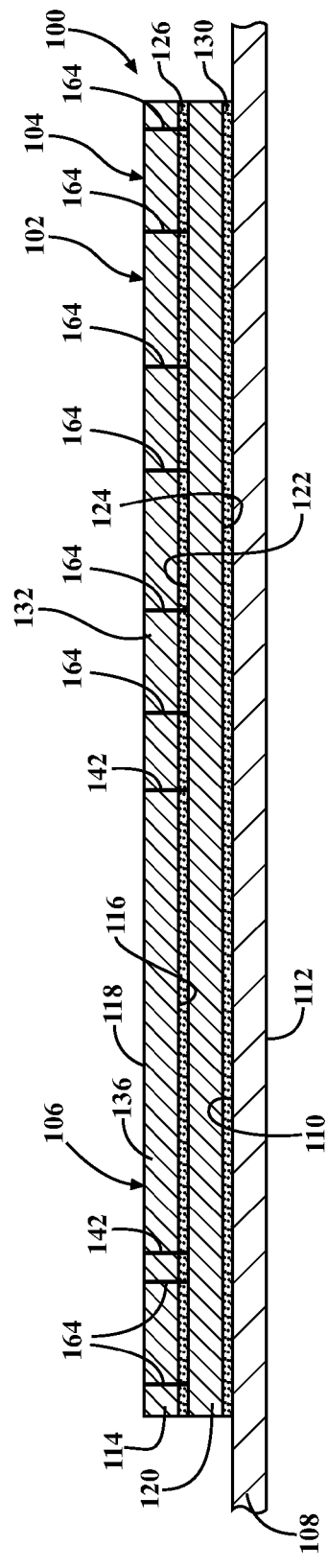

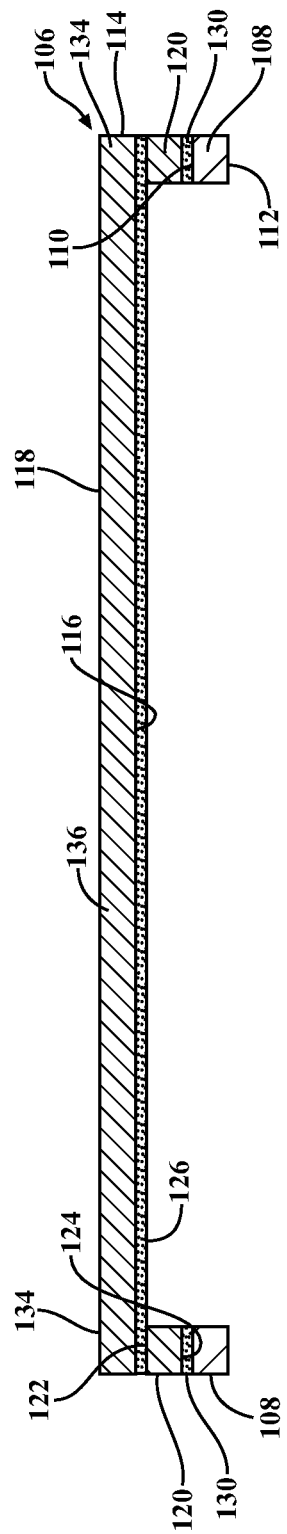
FIG. 7
FIG. 8

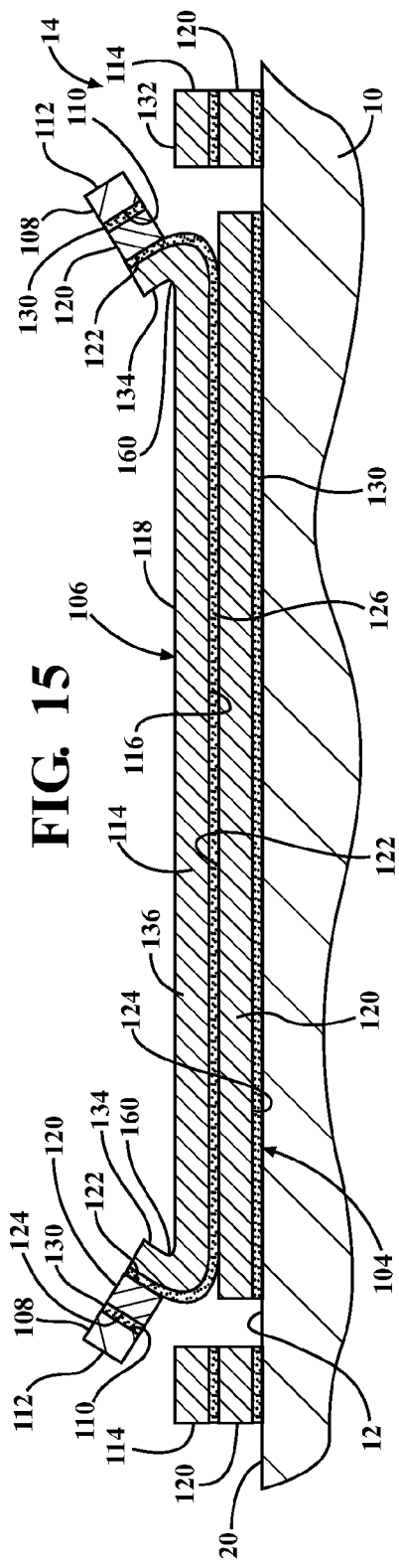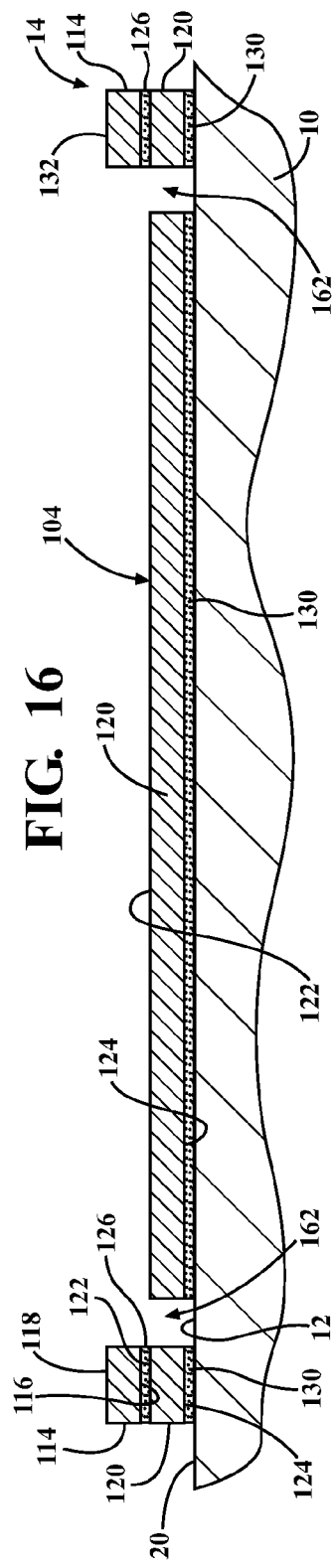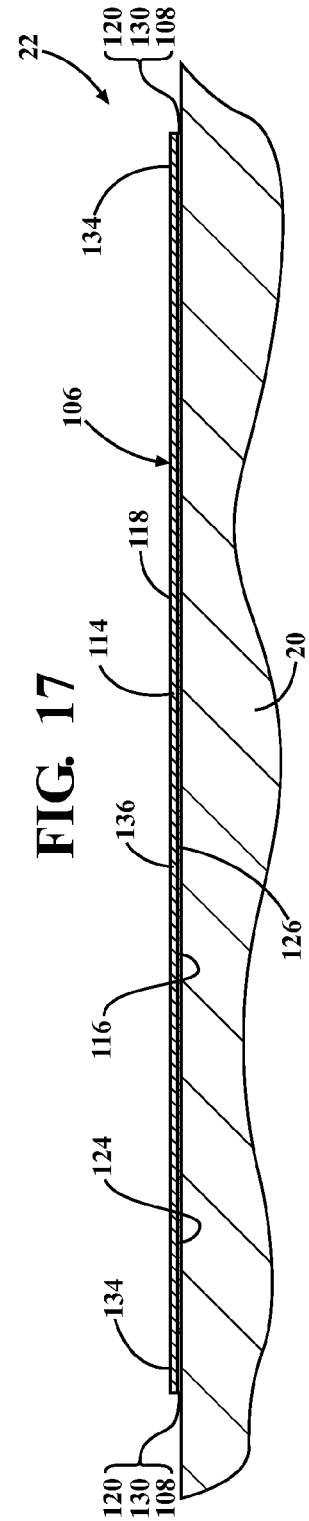

ADHESIVE LABEL ASSEMBLY

CROSS REFERENCE TO RELATED APPLICATIONS

The subject application claims priority to and all of the benefits of U.S. Provisional Application Ser. No. 62/001,319, filed May 21, 2014, the contents of which are expressly incorporated herein in their entirety.

FIELD OF THE DISCLOSURE

The present disclosure relates generally to an adhesive label assembly and, more particularly, to an adhesive label assembly for a shipping container.

BACKGROUND

Products are typically shipped in a container, such as a box, a crate, a bag, or other suitable shipping or packaging structure. A label, such as a shipping label, is often applied to one or more surfaces of the container when the product is being shipped. Typically, the shipping label has a front surface and indicia printed or otherwise established on the front surface. Examples of indicia which may be printed on the front surface of the shipping label include a product name, a manufacturer name and address, a part number or code, product instructions, a product quantity, and/or the like. The shipping label also typically has a back surface including an adhesive that can be directly applied to the surface of the container for attaching the label to the surface of the container.

Many shipping labels have a multi-label construction, such as a primary label and a secondary label carried by the primary label. The secondary label is often referred to as a piggyback label, because the secondary label piggybacks (i.e., is carried by) the primary label. Typically, the primary label is applied to the surface of the container, and the secondary label can be removed from the primary label and applied to another object, such as the product. In some instances, however, it may be difficult to remove the secondary label from the primary label, especially once the primary label has been applied to the surface of the container. Further, in some instances, the primary label may be easily removed from the surface of the container, and undesirable tampering of the primary label may not be readily evident.

Accordingly, the present disclosure is aimed at solving the problems identified above.

SUMMARY

In one embodiment, an assembly comprises a base layer of material having inner and outer surfaces, a top layer of material spaced from the base layer with the top layer having interior and exterior surfaces, a top layer adhesive disposed on the interior surface, a liner sandwiched between the top and base layers with the liner having first and second opposed surfaces with the first surface facing the interior surface of the top layer and the second surface facing the inner surface of the base layer, and a liner adhesive disposed on the second surface of the liner. The top layer, the liner, and a portion of the base layer collectively define a primary label removable from a remaining portion of the base layer. The primary label has a body section and a tab section with the body section defined by a portion of the top layer and a portion of the liner with the liner adhesive exposed, and the tab section defined by a remaining portion of the top layer, a remaining portion of the liner, and the portion of the base layer covering the liner adhesive of the remaining portion of the liner.

In another embodiment, a method of labeling a surface utilizing the assembly comprises the steps of removing a remaining portion of the base layer to expose the liner adhesive of the portion of the liner of the primary label and attaching the primary label to the surface.

BRIEF DESCRIPTION OF THE DRAWINGS

Advantages of the present disclosure will be readily appreciated as the same becomes better understood by reference to the following detailed description when considered in connection with the accompanying drawings. It is to be appreciated that the drawings are merely illustrative and are not necessarily drawn to scale.

FIG. 5 is a cross-sectional view of the adhesive label assembly taken along line 5-5 of FIG. 2.

FIG. 6 is a cross-sectional view of the adhesive label assembly taken along line 6-6 of FIG. 2.

FIG. 7 is a plan view of a secondary label of the adhesive label assembly.

FIG. 8 is a cross-sectional view of the secondary label taken along line 8-8 of FIG. 7.

FIG. 10 also illustrates tab sections of a secondary label being positioned at an angle relative to a middle section of the secondary label.

FIG. 15 is a cross-sectional view of the portion of the shipping container assembly taken along line 15-15 of FIG. 10.

FIG. 16 is a cross-sectional view of the portion of the shipping container assembly taken along line 16-16 of FIG. 12.

FIG. 17 is a cross-sectional view of the portion of the product assembly taken along line 17-17 of FIG. 13.

DETAILED DESCRIPTION

Figure 1:
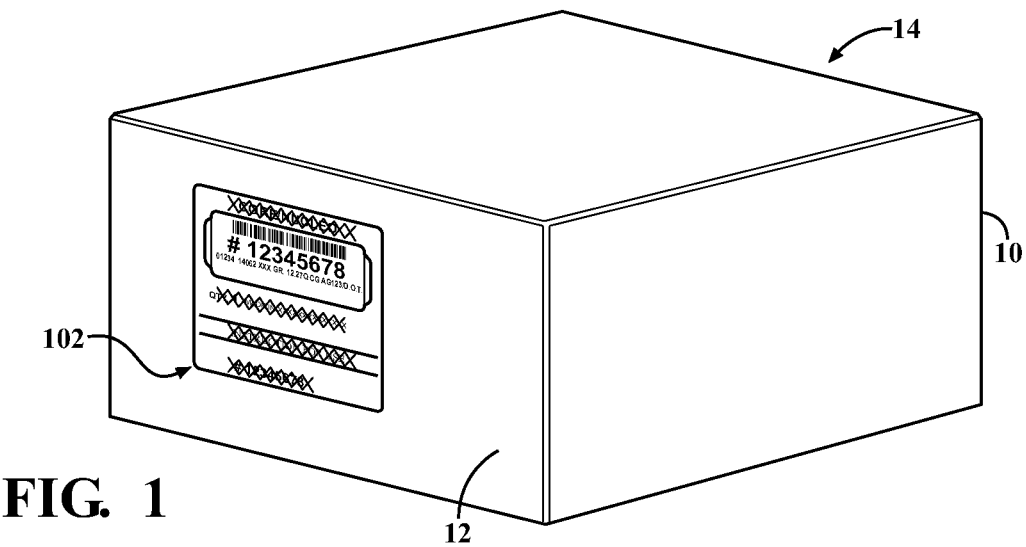
FIG. 1 is a perspective view of an example of a shipping container assembly.

Referring now to the Figures, wherein like numerals indicate like or corresponding parts throughout the several views, an assembly 100 such as an adhesive label assembly 100 is shown throughout the figures and is described in detail below. The assembly 100 includes an adhesive label 102 that may be applied and/or attached to an object, such as a shipping container 10. In an example, the adhesive label 102 is applied and/or attached to a container or crate for shipping automotive parts. As shown in FIG. 1, the adhesive label 102 is attached to a surface 12 of the container 10 to form a shipping container assembly 14. Other non-limiting examples of shipping containers include shipping crates, shipping boxes, shipping bags, shipping envelopes, and/or other shipping or packaging structures that are suitable for shipping products or goods. It is to be understood that the adhesive label 102 may also or otherwise be applied and/or attached to objects other than shipping containers, such as to walls, shelves, floors, equipment, furniture, boxes, totes, bins, cabinets, trays, files, folders, luggage/baggage (e.g., totes, backpacks, suitcases, etc.), and/or the like. The adhesive label 102 may also be applied and/or attached to objects make of or including plastic, wood, glass, rubber, tile, foams (such as Styrofoam™), cement, cinder blocks, vinyl surfaces, and paper products (such as cardboard).

Figure 10:
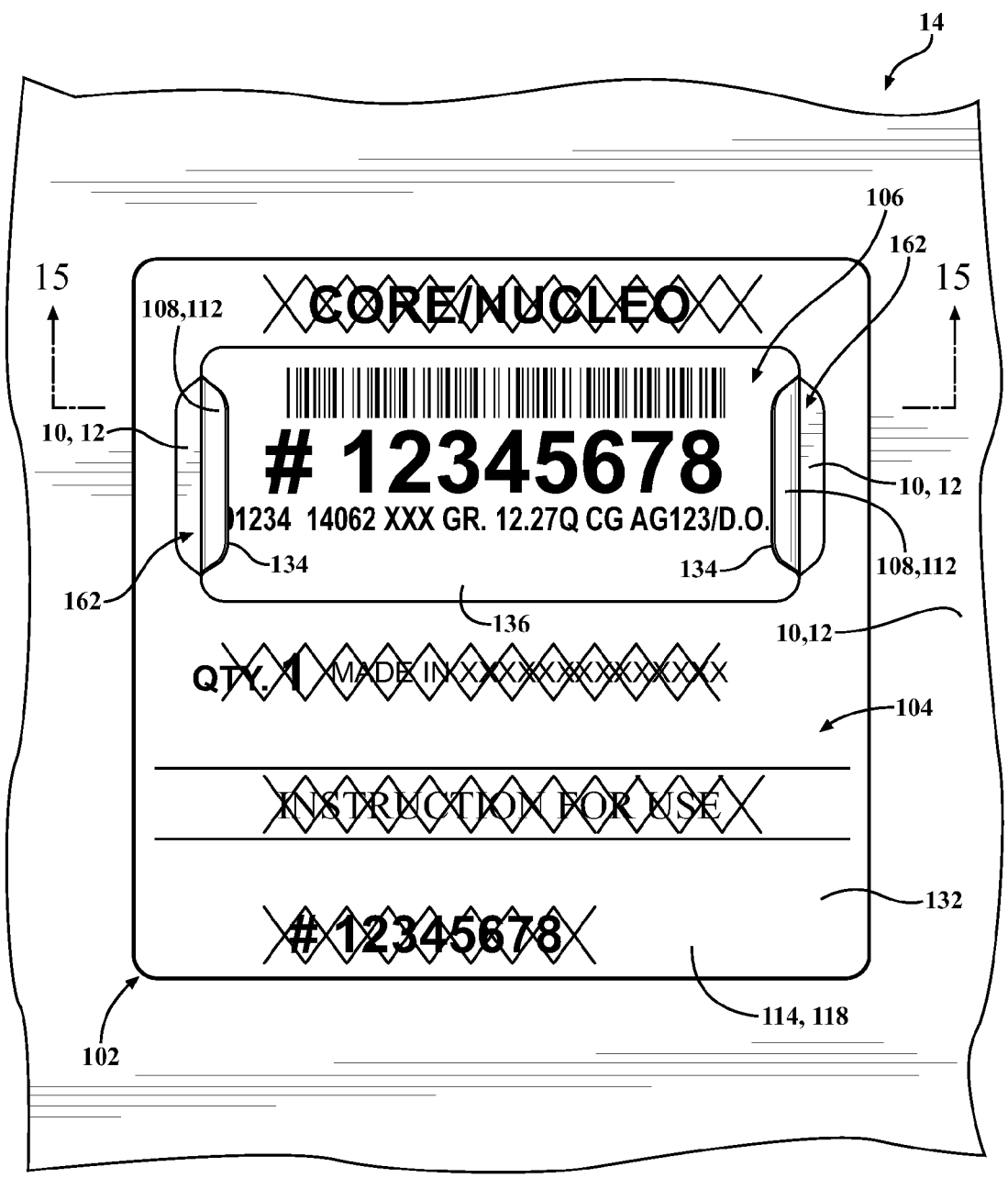
FIG. 10 is a side view of a portion of shipping container assembly with the adhesive label (which was removed from the base layer as shown in FIG. 9) attached to a shipping container.
Figure 13:
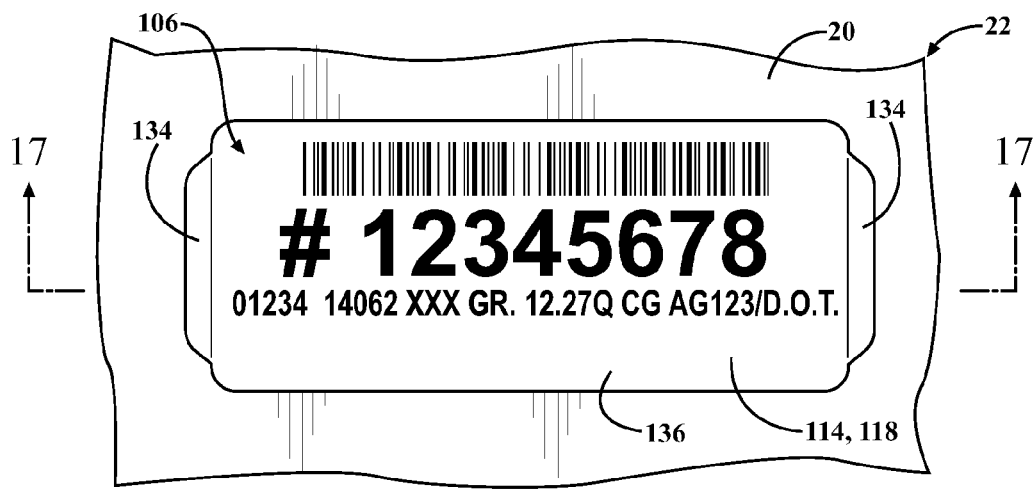
FIG. 13 is a side view of a portion of a product assembly including a product and the secondary label attached to the product.

The adhesive label 102 may have a multi-label construction. For example, the adhesive label 102 may include a primary label 104 and a secondary label 106 carried by and removable from the primary label 104. Accordingly, the secondary label 106 is said to piggyback the primary label 104. As described in further detail below, the secondary label 106 is carried by the primary label 104 typically when the adhesive label 102 is applied and/or attached to the surface 12 of the shipping container 14. An example of this is shown in FIGS. 1 and 10. Further, the secondary label 106 is removable from the primary label 104 and the secondary label 106 may be applied and/or attached to another object, such as a product 20 to form a product assembly 22. An example of this is shown in FIGS. 13 and 17. It is noted that the layers 108, 114, 120 and the adhesives 126, 130 are shown in FIG. 17 as being much thinner than as shown in other figures. Further, the thickness of the top layer adhesive 126 is shown as being thicker than the liner adhesive 130 in FIG. 17; however, it is to be noted that the respective thicknesses of the adhesives 126, 130 is typically about the same. It is also noted that FIG. 17 is the same as FIG. 8 except that the secondary label 106 in FIG. 17 is attached to the product 20.

In an embodiment, the adhesive label assembly 100 includes a base layer 108 of material having inner 110 and outer 112 surfaces, a top layer 114 of material spaced from the base layer 108 and having interior 116 and exterior 118 surfaces, and a liner 120 sandwiched between the top layer 114 and the base layer 108 and having first 122 and second 124 opposed surfaces. The first surface 122 of the liner 120 faces the interior surface 116 of the top layer 114, and the second surface 124 of the liner 120 faces the inner surface 110 of the base layer 108. The top layer 114, the liner 120, and a portion of the base layer 108 collectively define the Primary label 104 removable from a remaining portion of the base layer 108. It is noted that the Layer 108, 114, and 120 are grossly exaggerated for merely for purposes illustrating the embodiments and examples of the adhesive label assembly 100. The top layer 114 has the exterior surface 118, which may represent a printable front side of the adhesive label 102. The top layer 114 is typically formed from or includes any suitable material, which may be opaque and may have any desirable color, such as white, yellow, green, blue, purple, gray, ect. The color may be achieved, for example, by incorporating a pigment, a dye, and/or the like into the material of the top layer 114. Alternatively, the top layer 114 may be from or include a material which may be transparent or semi-transparent.

Figure 2:
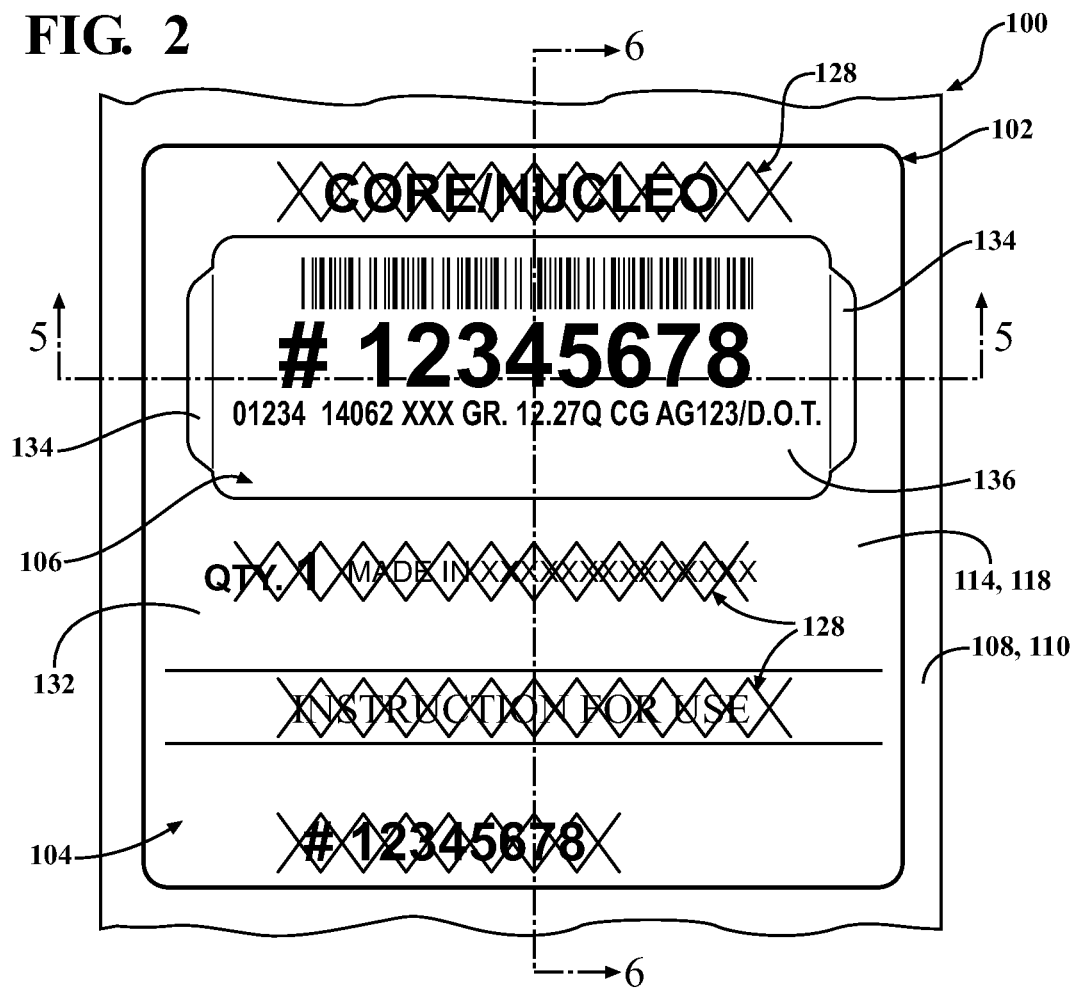
FIG. 2 is a plan view of an embodiment of the adhesive label assembly.
Figure 3:
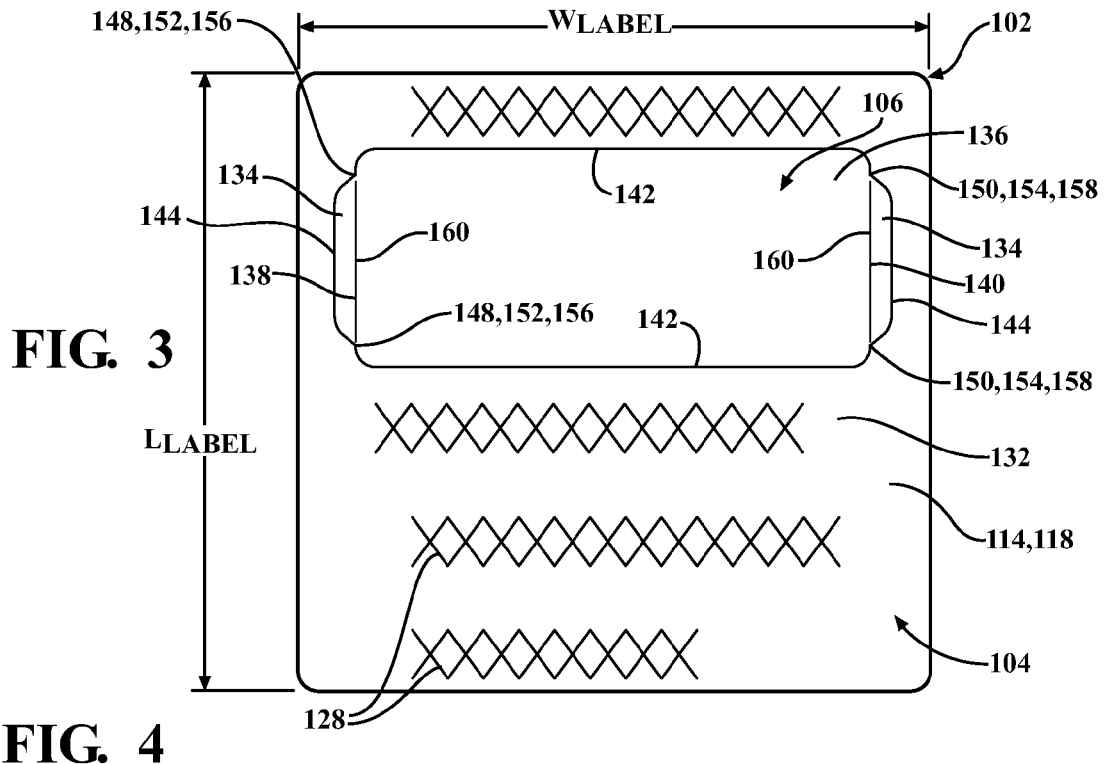
FIG. 3 is another plan view of the adhesive label assembly of FIG. 2.
Figure 4:
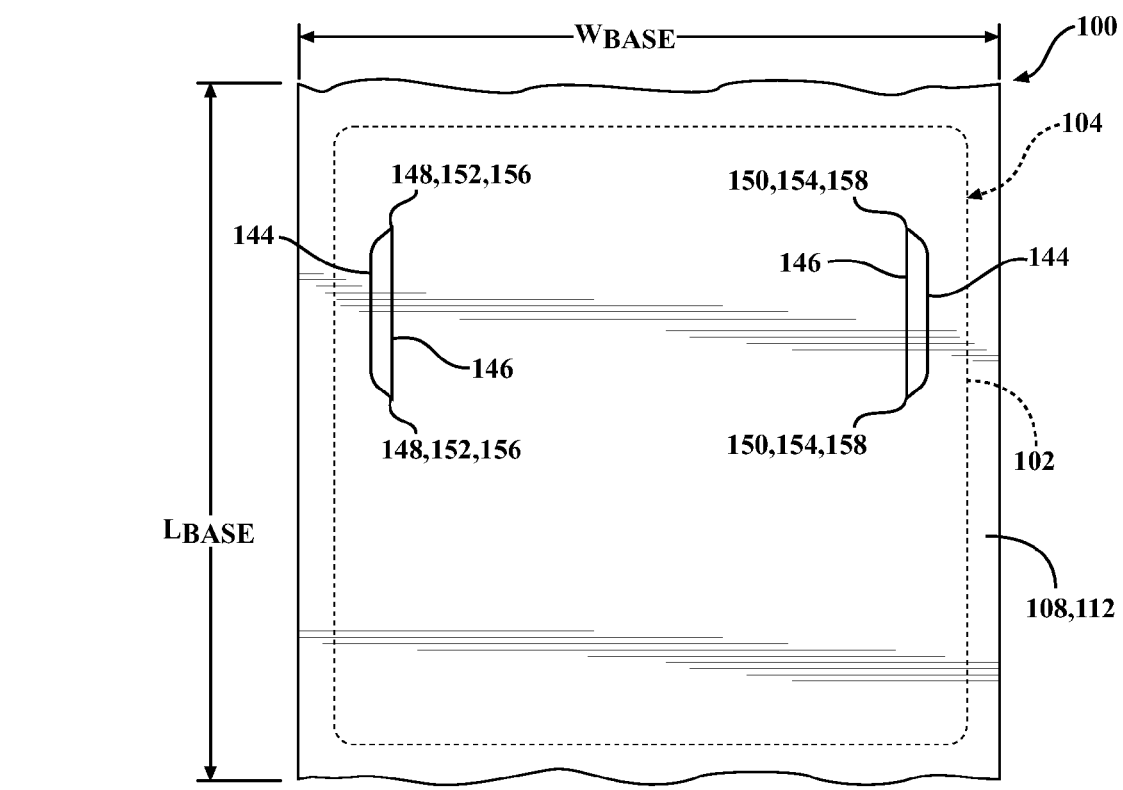
FIG. 4 is a bottom view of the adhesive label assembly of FIG. 2 with the indicia removed.

The top layer 114 may also be formed from or include a material that can suitably receive an ink to produce graphic and/or alphanumeric indicia on the exterior surface 118 of the top layer 114. Graphic and/or alphanumeric indicia produced on the exterior surface 118 of the top layer 114 is/are shown at least in FIG. 2. In an example, the graphic and/or alphanumeric indicia may be printed on the exterior surface 118 of the top layer 114 utilizing any suitable printing process, such as inkjet printing, laser printing, thermal printing, flexographic printing, etc. Alternatively, the graphic and/or alphanumeric indicia may be printed on the exterior surface 118 of the top layer 114 by hand, such as by handwriting the indicia using a pencil, a pen, a marker, and/or the like. Non-limiting examples of graphic and/or alphanumeric indicia that may be printed on the exterior surface 118 of the top layer 114 include barcodes, part or product numbers, quantity of parts or products containing in the container 10, a name and/or address of the manufacturer of the parts or products, a manufacturer logo, graphic illustrations of how to use the adhesive label assembly 100, written instructions for how to use the adhesive label assembly 100, shipping instructions, and/or the like. In an example, the primary label 104 includes the indicia, the secondary label 106 includes the indicia, or both the primary 104 and secondary 106 labels include the indicia. In instances where both the primary 104 and secondary 106 labels include the indicia, the labels 104, 106 each may include indicia that are at least partially identical.

The adhesive label assembly 100 further includes a top layer adhesive 126 disposed on the interior surface 116 of the top layer 114. In an example, the top layer adhesive 126 is coated, sprayed, painted, or otherwise formed on the interior surface 116 of the top layer 114. While the top layer adhesive 126 is shown in the figures as a distinct layer, the adhesive 126 may also be formed as a film, coating, and/or the like. The top layer adhesive 126 may be chosen from any material that enables the top layer 114 to suitably adhere to the underlying liner 120, yet allows the top layer 114 to be removable from the liner 120. In an example, the top layer adhesive 126 is chosen from a strong adhesive. With a strong adhesive 126, the top layer 114 cannot be separated from the liner 120 of the primary label 104 without activating tamper-evident elements 128 of the adhesive label 102. The tamper-evident elements 128 are described in further detail below. Although the adhesive 126 is strong, it is to be appreciated that the secondary label 106 can be separated from the primary label 104 without damaging the secondary label 106.

As previously described, the liner 120 of the adhesive label assembly 100 has the first 122 and second 124 opposed surfaces with the first surface 122 facing the interior surface 118 of the top layer 114 and the second surface 124 facing the inner surface 110 of the base layer 108. In an example, the liner 120 may be a paper liner, such as a 40-pound paper liner made from or including a paper-based material. In an example, a silicone coating or film is disposed, formed, or applied on the first surface 122 of the liner 120 for facilitating removal of said top layer 114 from said liner 120. The silicone film typically has releasable properties that enable the top layer 114 to be separated and/or removed from the liner 120.

The adhesive label assembly 100 further includes a liner adhesive 130 disposed on the second surface 124 of the liner 120. In an example, the liner adhesive 130 is coated, sprayed, painted, or otherwise formed on the second surface 124 of the liner 120. While the liner adhesive 130 is shown in the figures as a distinct layer, the adhesive 130 may also be formed as a film, coating, and/or the like. In an example, the liner adhesive 130 may be chosen from any material that will suitably adhere to the underlying base layer 108, yet is removable from the base layer 108. Additionally, the liner adhesive 130 may be chosen from any material that will suitably adhere to the shipping container 10. In an example, the liner adhesive 130 is a strong adhesive. With a strong adhesive, it may be difficult to remove the primary label 104 from the surface 12 of the shipping container 10 without damaging the label 104 (such as by ripping the label 104) and/or the shipping container 10 (such as by tearing the surface 12 of the container 10). In an example, the liner adhesive 130 is the same as the top layer adhesive 126. In another example, the liner adhesive 130 is selected from a material which has stronger adhesive properties than the top layer adhesive 126.

Each of the top layer 114 and the liner 120 may have substantially the same length and width. Further, the adhesive label 102 (which includes the top layer 114, the liner 120, and a portion of the base layer 108) may have any desirable length $L_{Label}$ and width $W_{Label}$. In an example, the length $L_{Label}$ of the adhesive label 102 is from about 3 inches to about 5 inches and the width $W_{Label}$ of the adhesive label 102 is from about 3 inches to about 5 inches. In another example, the length $L_{Label}$ of the adhesive label 102 is about 4 inches and the width $W_{Label}$ of the adhesive label 102 is about 4 inches. It is to be understood, however, that the adhesive label 102 can have a length $L_{Label}$ and/or width $W_{Label}$ which is larger or smaller than the ranges set forth above. Additionally, the adhesive label 102 may have any desirable shape, such as a square shape, a rectangular shape, a circular shape, an oval shape, a pentagonal shape, a hexagonal shape, etc. In instances where the adhesive label 102 has a shape other than a square shape or a rectangular shape, the size of the adhesive label 102 may be measured using other dimensions, such as a diameter, a radius, etc.

The base layer 108 has the interior 110 and exterior 112 surfaces where the interior surface 110 faces the second surface 124 of the liner 120. The exterior surface 112 of the base layer 108 may represent a back side of the adhesive label assembly 100. In an example, the base layer 108 may be a paper liner, such as a 40-pound paper liner made from or including a paper-based material. In another example, the base layer 108 may be a polyester liner, such as a clear or partially clear polyester 1.2 mil liner. In an example, the base layer 108 may have a silicone coating disposed on the inner surface 110 of the base layer 108 for facilitating removal of the liner 120 from the base layer 108.

In an example, the adhesive label assembly 100 may be provided as a strip of adhesive label assemblies 100. For instance, a plurality of adhesive labels 102 (e.g., a plurality of primary labels 104 with each primary label 104 having a respective one of the top layer 114 and a respective one of the liner 120 and a respective secondary label 106 carried by the primary label 104) may be attached to or share a common base layer 108. Further, the adhesive labels 102 may be arranged in any desirable arrangement and/or order. In the example shown in FIG. 9, the adhesive labels 102 are arranged in a single column. In another example, a plurality of adhesive labels 102 may be coupled to the common base layer 108, and the labels 102 may be arranged two-by-two, staggered, randomly, etc. Alternatively, each adhesive label 102 may have its own base layer 108 to form an individual adhesive label assembly 100. In this example, a plurality of individual adhesive label assemblies 100 may be stacked or included in a box, a bag, and/or the like. Even further, a plurality of adhesive label assemblies 100 may be provided in sheets, where each sheet includes a preset number of adhesive labels 102. For example, each sheet may have two, four, six, etc. adhesive labels 102 with the adhesive labels 102 of each sheet sharing a common base layer 108.

In instances where the adhesive label assemblies 100 include a plurality of adhesive labels 102 sharing a common base layer 108, the base layer 108 may have a size (such as a length $L_{Base}$ and/or width $W_{Base}$) that is larger than the size (such as the length $L_{Label}$ and/or width $W_{Label}$) of each of the adhesive labels 102. In instances where the adhesive label assemblies 100 are provided individually, then the base layer 108 for each adhesive label assembly 100 may have the same size as its respective adhesive label 102, or the size of the base layer 108 may be different from (e.g., slightly larger than) the size of its respective adhesive label 102.

As previously mentioned, the top layer 114, the liner 120, and a portion of the base layer 108 collectively define the primary label 104. As shown, the primary label 104 has a body section 132 and a tab section 134. The body section 132 is defined by a portion of the top layer 114 and a portion of the liner 120 with the liner adhesive 130 exposed. The tab section 134 is defined by a remaining portion of the top layer 114, a remaining portion of the liner 120, and the portion of the base layer 108 covering the liner adhesive 130 of the remaining portion of the liner 120.

In an embodiment, the adhesive label assembly 100 has a two-label construction, and includes the primary label 104 and the secondary label 106 carried by and removable from the primary label 104. The secondary label 106 defines a middle section 136 of the body section 132 of the primary label 104 and includes the tab section 134. The middle section 136 may have any desirable shape, such as a rectangular shape, a square shape, a circular shape, a triangular shape, etc. As shown, the middle section 136 has a rectangular shape. Further, the tab section 132 may have any desirable shape, such as a rectangular shape, a square shape, a trapezoidal shape, a rounded shape, etc. As shown, the tab section 134 has a trapezoidal shape. In an example, the secondary label 106 includes the middle section 136 and a single tab section 134. In another example, the tab section 134 is one of a plurality of tab sections 134 (such as two, three, four, etc. tab sections 134). As shown, the secondary label 106 includes the middle section 136 and two tab sections 134. For instance, the middle section 136 of the secondary label 106 may have first 138 and second 140 ends and a first tab section 134 at the first end 138 and a second tab section 134 at the second end 140.

The middle section 136 and the tab sections 134 of the secondary label 106 are defined by a plurality of cut lines. As shown in FIGS. 5 and 6, the adhesive label assembly 100 includes a first cut line 142, a second cut line 144, and a third cut line 146. Each of the cut lines 142, 144, 146 is shown in FIGS. 5 and 6 utilizing thick lines merely for purposes of clarity. The first cut line 142 extends through the top layer 114. In an embodiment, the first cut line 142 extends through the top layer 114 and the top layer adhesive 126. The cut line 142 does not extend into the liner 120. In an example, the adhesive label assembly 100 includes two first cut lines 142 with each of the first cut lines 142 partially defining the middle section 136 of the secondary label 106. The first cut lines 142 may be formed utilizing a suitable cutting tool, such as a die cutter, which is applied to the assembly 100 from the front side of the adhesive label assembly 100 (such as from the exterior surface 118 of the top layer 114). The cutting tool forms the first cut lines 142 by cutting through the top layer 114 and the top layer adhesive 126. In an example, each of the first cut lines 142 terminates at end points 148, 150.

The second cut line 144 extends through the top layer 114, the liner 120, and the base layer 108. In an embodiment, the second cut line 144 extends through the top layer 114, the top layer adhesive 126, the liner 120, the liner adhesive 130, and the base layer 108. In an example, the adhesive label assembly 100 includes two second cut lines 144 with each of the second cut lines 144 partially defining a respective tab section 134 of the secondary label 106 at the ends 138, 140 of the middle section 136. The second cut lines 144 may be formed utilizing any suitable cutting tool, such as a die cutter, which is applied to the assembly 100 from the front side of the adhesive label assembly 100 (such as from the exterior surface 118 of the top layer 114) or may be applied to the assembly from the back side of the adhesive label assembly 100 (such as from the outer surface 112 of the base layer 108). The cutting tool forms the second cuts 144 by cutting through the top layer 114, the top layer adhesive 126, the liner 120, the liner adhesive 130, the base layer 108. In an example, each of the second cut lines 144 terminates at end points 152, 154, where the end point 152 abuts or is located at the end point 148 and the end point 154 abuts or is located at the end point 150.

The third cut line 146 extends through the base layer 108 and the liner 120. In an embodiment, the second cut line 144 extends through the base layer 108, the liner adhesive 130, and the liner 120. In an example, the adhesive label assembly 100 includes two third cut lines 146 with each of the third cut lines 146 partially defines the middle section 136 of the secondary label 106. Further, each of the third cut lines 146 partially defines a respective tab section 134 of the secondary label 106 at the ends 138, 140 of the middle section 136. The third cut lines 146 may be formed utilizing any suitable cutting tool, such as a die cutter, which is applied to the assembly 100 from the back side of the adhesive label assembly 100 (such as from the outer surface 112 of the base layer 108). The cutting tool forms the third cut lines 146 by cutting through the base layer 108, through the liner adhesive 130, and through the liner 120. In an example, each of the third cut lines 146 terminates at end points 156, 158, where the end point 156 abuts or is located at the end points 148, 152 and the end point 158 abuts or is located at the end points 150, 154.

It is to be understood that the ends points 148, 152, 156 represent a transition point from the middle section 136 to the first tab section 134 at the first end 138 of the secondary label 106. It is also to be understood that the end points 150, 154, 158 represent a transition point from the middle section 136 to the second tab section 134 at the second end 140 of the secondary label 106.

In an embodiment, the secondary label 106 includes a living hinge 160 defined in the top layer 114 with the living hinge 160 separating each of the tab sections 134 from the middle section 136 of the secondary label 106. The living hinge 160 enables each of the tab sections 134 to be positioned at an angle relative to the middle section 136 of the secondary label 106. For example, the tab sections 134 may be bent (such as bent upwardly) by virtue of the living hinge 160 so that the tab sections 134 can be positioned at an angle greater than 0° relative to the middle section 136. Said differently, the tab sections 134 may be bent by virtue of the living hinge 160 so that the tab sections 134 are can be set at a position which is angularly offset from middle section 136.

Accordingly, and as shown at least in FIG. 8, the secondary label 106 includes the middle section 136 composed primarily of a portion of the top layer 114 and a portion of the top layer adhesive 126. Further, the secondary label 106 includes the tab sections 134, each composed primarily of another portion of the top layer 114, another portion of the top layer adhesive 126, a portion of the liner 120, a portion of the liner adhesive 130, and a portion of the base layer 108. When the secondary label 106 is removed from the primary label 104, the respective portions of the liner 120 and the base layer 108 partially defining the tab sections 134 are carried along with the secondary label 106. Accordingly, the primary label 104 includes a gap 162 at each of the tab sections 132 when the secondary label 106 is removed.

As previously mentioned, the adhesive label assembly 100 further includes a plurality of tamper-evident elements 128, which are defined in the top layer 114 of the primary label 104. In an example, the tamper-evident elements 128 may be defined by a plurality of cut lines 164 extending through the top layer 114. None of the cut lines 164 extend through the liner 120 and the base layer 108. The cut lines 164 may be formed utilizing a suitable cutting tool, such as a die cutter, which is applied to the assembly 100 from the front side of the adhesive label assembly 100 and cuts through the top layer 114 (and through the top layer adhesive 126). In an example, the cut lines 164 are formed at the same time as the first 142, second 144, and third 146 cut lines are formed utilizing a single die cutter. In another example, the cut lines 164 are formed separately from the cut lines 142, 144, 146 utilizing a different die cutter. As shown, the cut lines 164 are interconnected to form a chain of diamond-like structures with each structure being a tamper-evident element 128. It is to be appreciated, however, that the cut lines 164 may form any shape and/or pattern, such as a plurality of connected or non-connected circles, a plurality of connected or non-connected triangles, and/or the like.

The embodiments and examples of the adhesive label assembly 100 described above may be used for labeling shipping containers, boxes, and/or the like. Typically, the adhesive label 102 (namely, the primary label 104 with the secondary label 106 which is carried by the primary label 104) is removed from the base layer 108, and the adhesive label 102 is applied to the surface 12 of the shipping container 10 as shown in FIG. 1. Typically, the graphic and/or alphanumeric indicia printed on the exterior surface 118 of the top layer 114 includes an identification number, a barcode, and/or the like which identifies the part or product contained in the shipping container 10. In an example, graphic and/or alphanumeric indicia is set forth on the body section 132 of the primary label 104 and graphic and/or alphanumeric indicia is set forth on the middle section 136 of the secondary label 106. In another example, the indicia included on the body section 132 and the middle section 136 is at least partially identical.

In some instances, it may be desirable to label the part or product in addition to labeling the shipping container 10, such as when returning the part or product to the manufacturer. In an example, the secondary label 106 may be separated from the primary label 104 (which may have already been attached to the surface 12 of the shipping container 10) and the secondary label 106 may be applied directly to the part or product that is being returned to the manufacturer. Further details of the use of the adhesive label assembly 100 to label both the shipping container and the product is described below with reference to FIGS. 9-17.

Figure 9:
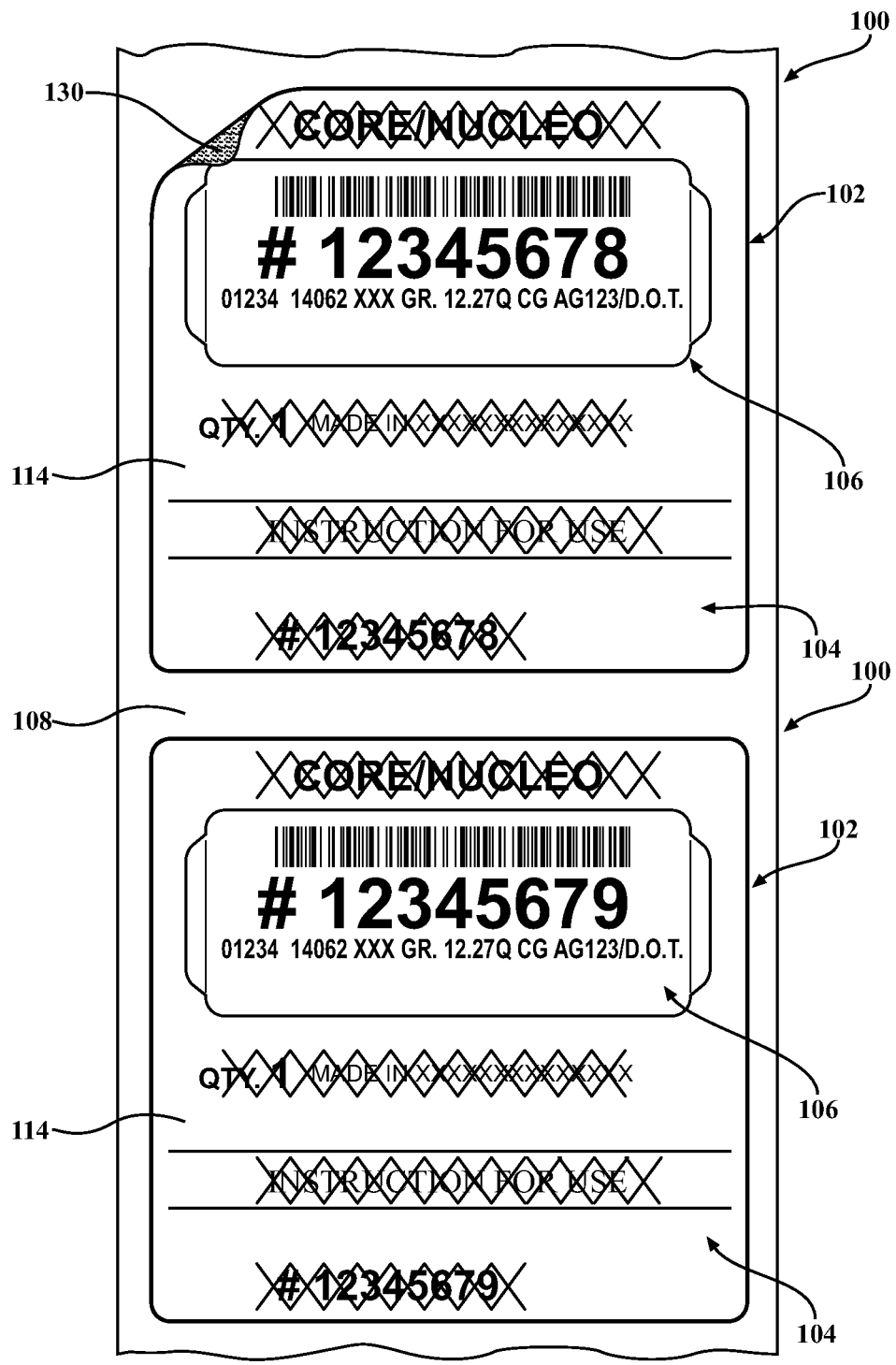
FIG. 9 illustrates an example of a strip of adhesive label assemblies with one of the adhesive labels being separated from a common base layer.

In an example, a method of labeling a surface (such as the surface 12 of the shipping container 10) includes the step of removing the remaining portion of the base layer 108 (i.e., the portion of the base layer 108 which is not part of the tab sections 134) to expose the liner adhesive 130 of primary label 104, and attaching the primary label 104 to the surface 12. For instance, and as shown in FIG. 9, an adhesive label 102 included in a strip of label assemblies 100 (which includes the primary label 104 and the secondary label 106 carried by the primary label 104) is removed from a remaining portion of a common base layer 108. As shown in FIG. 9, one of the adhesive label 102 of one of the adhesive label assemblies 100 is removed form the remaining portion of the base layer 108 by peeling the primary label 104 from the common base layer 108 and exposing the liner adhesive 130 of the adhesive label 102.

Once the adhesive label 102 has been completely separated from the base layer 108 (noting that a portion(s) of the base layer 108 remains with the adhesive label 102 as part of the tab section(s) 134), the adhesive label 102 may be coupled to an object, such as the shipping container 10. This is shown in FIGS. 10 and 15. The adhesive label 102 may be coupled to the shipping container 10, for example, by applying the exposed liner adhesive 130 of the liner 120 to the surface 12 of the shipping container 10.

Typically, when the adhesive label 102 is coupled to the shipping container 10, the primary label 104 is directly attached (e.g., adhered) to the surface 12 of the shipping container 10 and the secondary label 106 is carried by the primary label 104. In some instances, the secondary label 106 may be removed prior to attaching the primary label 104 to the container 10. In this instance, the primary label 104 is attached to the surface 12 of the container 10 without carrying the secondary label 106.

Figure 11:
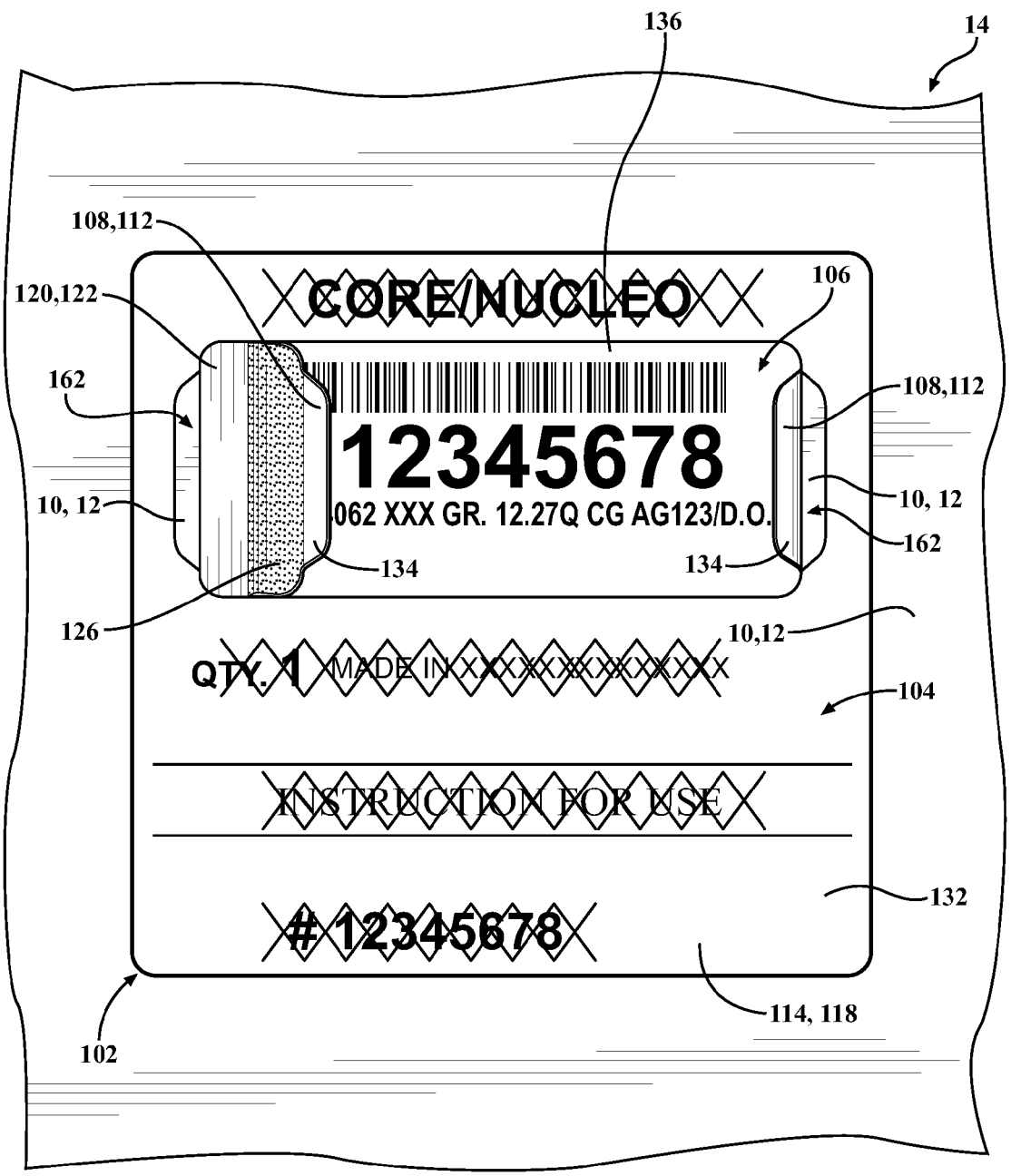
FIG. 11 is a side view of the portion of the shipping container assembly with the secondary label of the adhesive label in the process of being removed from the primary label.

In instances where it is desirable to label another object, such as the part or product 20, the secondary label 106 may be separated from the primary label 104 and attached directly to the part or product 20. Separating the secondary label 106 from the primary label 104 is depicted in FIGS. 10, 11, and 15. Specifically, and as shown in FIGS. 10 and 15, the secondary label 106 may be separated from the primary label 104 by bending one or more of the tab sections 134 via the living hinge 160 so that the tab section(s) 134 is/are positioned at an angle greater than 0° relative to the middle section 136 of the secondary label 106. When the tab section(s) 134 is/are bent, the portions of the liner 120 and the base layer 108 which are part of the tab section(s) 134 are carried with the top layer 114 of the tab section(s) 134. This provides a gripping surface of the user so that that secondary label 106 can be easily removed from the primary label 104 when the adhesive label 102 is or is not attached to a surface, such as the surface 12 of the container 10. Additionally, when the tab section(s) 134 are bent, the gap(s) 162 appear in the liner 120 of the primary label 104 such that the surface 12 of the shipping container 10 is exposed through the gaps 162.

The secondary label 106 may be separated or removed from the primary label 104, for example, by grasping (such as with fingers, pliers, and/or the like) and pulling one or both of the tab sections 134. When the tab section(s) is/are pulled, the secondary label 106 peels away from the underlying liner 120 of the primary label 104. This is shown in FIG. 11.

When the secondary label 106 has been is removed from the primary label 104, the top layer adhesive 126 of the middle section 136 of the secondary label 106 is exposed. Further, the secondary label 106 may be attached to a part or product (such as the product 20 as shown in FIG. 13) by removing the portions of the liner 120 and the base layer 108 of the tab sections 134 to expose the top layer adhesive 126 of the tab sections 134 and applying the secondary label 106 (i.e., the middle section 136 and tab sections 134 with the top layer adhesive 126 exposed) directly to the part or product 20.

Figure 12:
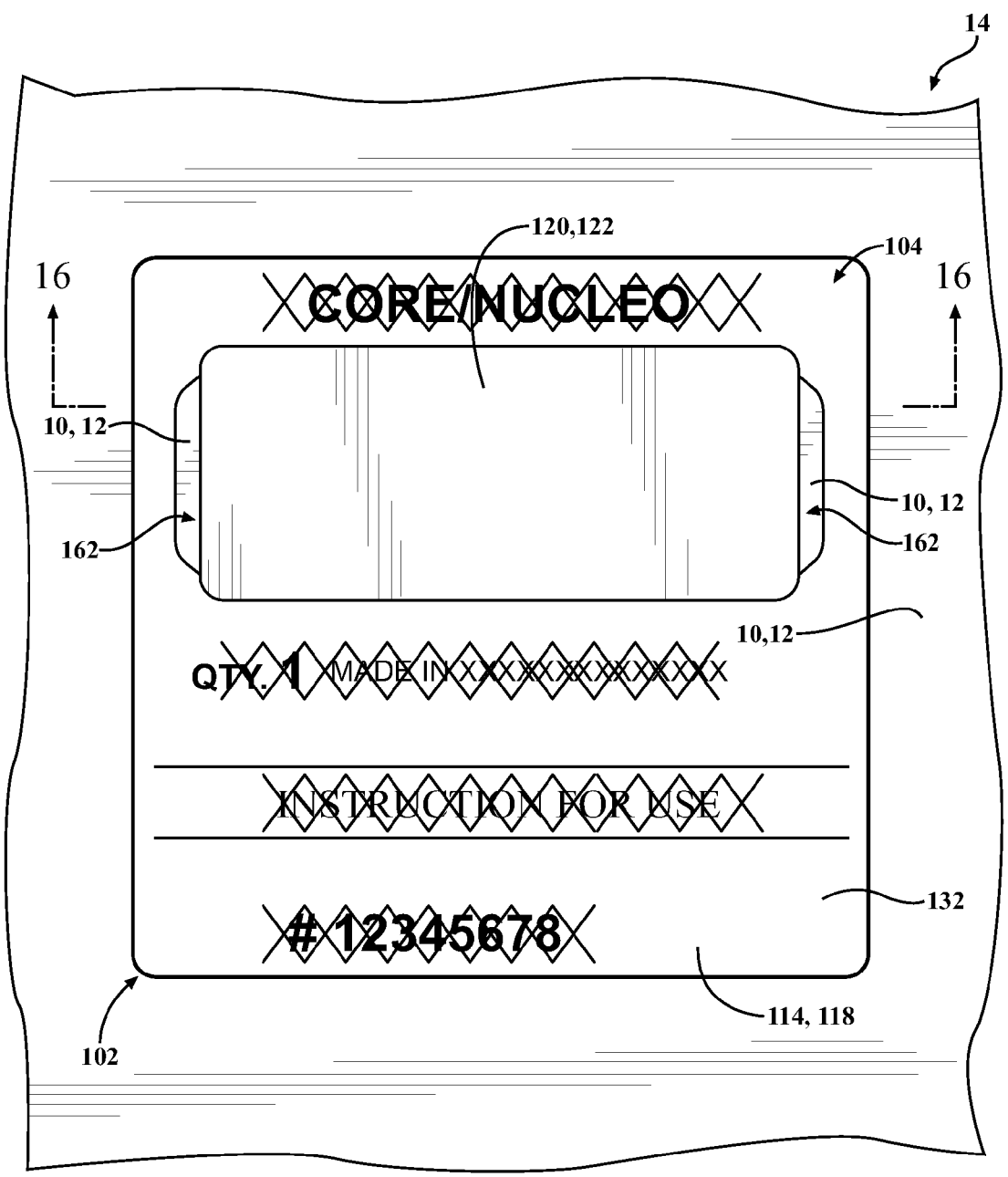
FIG. 12 is a side view of the portion of the shipping container assembly with a primary label of the adhesive label attached to the shipping container with the secondary label removed.

It is to be appreciated that after the secondary label 106 has been removed, the primary label 104 typically remains attached to the surface 12 of the shipping container 10 with a portion of the liner 120 exposed. This is shown in FIGS. 12 and 16.

Figure 14:
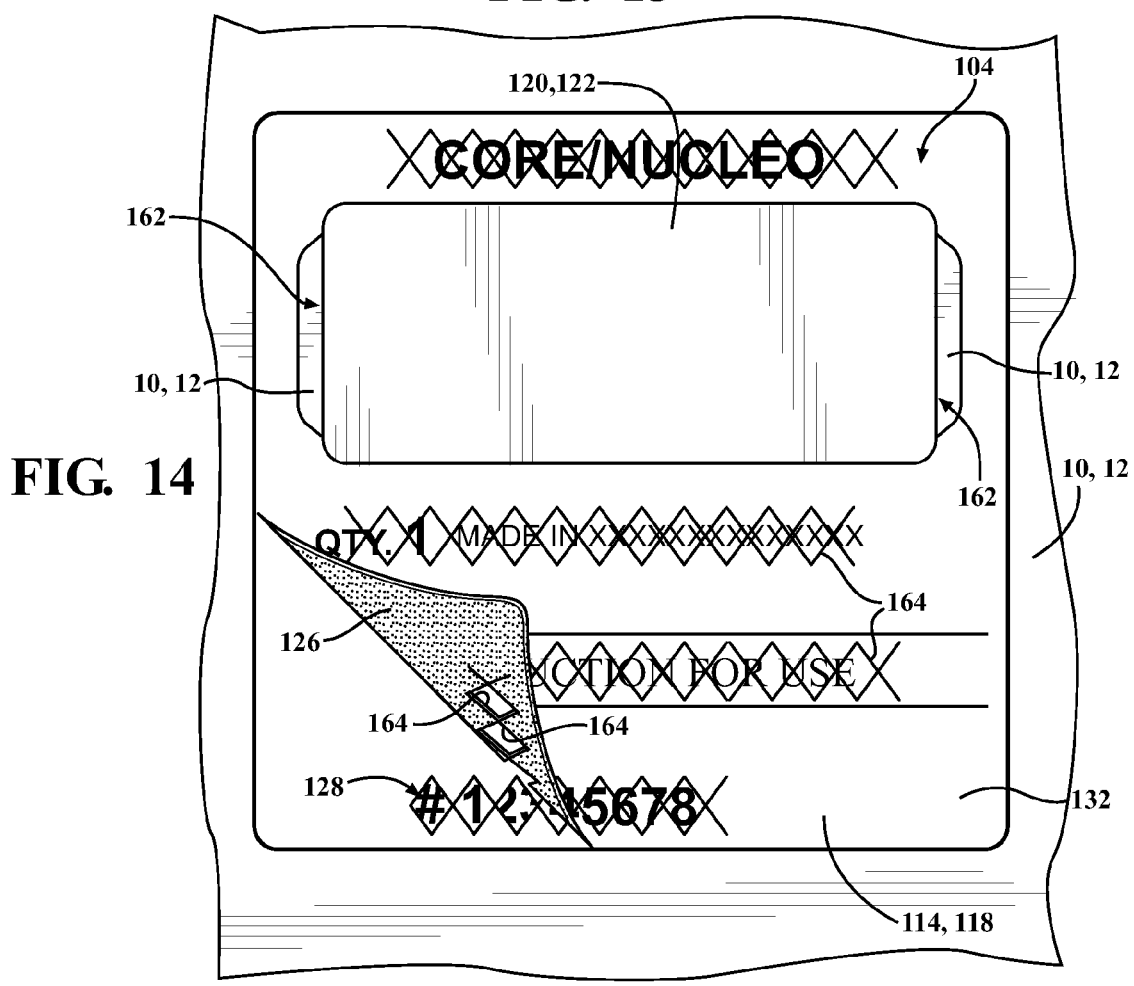
FIG. 14 illustrates the portion of the shipping container assembly of FIG. 12 with the primary label in the process of being removed from the shipping container.

As previously mentioned, the adhesive label 102 further includes the tamper-evident elements 128 formed by the plurality of cut lines 164. The tamper-evident elements 128 typically remain attached to the shipping container 10 in instances where the top layer 114 of the primary label 104 is attempted to be removed. For example, when the adhesive of the top layer adhesive 126 is strong, the tamper-evident elements 128 (such as the diamonds) remain attached to the shipping container 10 when the primary label 104 is being removed. This is shown in FIG. 14. Since the tamper-evident elements 128 remain attached to the shipping container 10, the primary label 104 that was attempted to be removed from the shipping container 10 is altered because one or more of the tamper-evident elements 128 are missing from the primary label 104. To this end, it would be evident that the primary label 104 has been tampered with when the altered primary label 104 is attached to another shipping container.

In an example, the adhesive label assembly 100 may further include a tracking device (not shown), such as a radio frequency identification (RFID) tag or chip. The tracking device may, for example, be coupled to (such as laminated to) the top layer 114 of the adhesive label assembly 100.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An assembly comprising:
   a base layer of material having inner and outer surfaces and a releasable coating on said inner surface;
   a top layer of material spaced from said base layer with said top layer having interior and exterior surfaces;
   a top layer adhesive disposed on said interior surface;
   a liner sandwiched between said top and base layers with said liner having first and second opposed surfaces with said first surface facing said interior surface of said top layer and said second surface facing said inner surface of said base layer and said liner having a releasable coating on said first surface;
   a liner adhesive disposed on said second surface of said liner; and
   said top layer, said liner, and a portion of said base layer collectively defining a primary label removable from a remaining portion of said base layer, said primary label having a body section and a tab section with said body section defined by a portion of said top layer and a portion of said liner with said liner adhesive exposed, and said tab section defined by a remaining portion of said top layer, a remaining portion of said liner, and said portion of said base layer covering said liner adhesive of said remaining portion of said liner.

2. The assembly as set forth in claim 1 further comprising a secondary label carried by and removable from said primary label with said secondary label defining a middle section of said body section including said tab section.

3. The assembly as set forth in claim 2 wherein said tab section is one of a plurality of tab sections.

4. The assembly as set forth in claim 2 wherein said body section and said middle section include indicia that is at least partially identical.

5. The assembly as set forth in claim 2 wherein said secondary label includes a living hinge defined in said top layer with said living hinge separating said tab section from said middle section of said secondary label and said living hinge enabling said tab section to be positioned at an angle relative to the middle section of the secondary label.

6. The assembly as set forth in claim 2 wherein said middle section of said secondary label has first and second ends and said tab section of said secondary label is one of two tab sections with a first tab section at said first end of said middle section and said second tab section at said second end of said middle section.

7. The assembly as set forth in claim 2 said primary label includes a gap at said tab section when said secondary label is removed.

8. The assembly as set forth in claim 1 further comprising:
a first cut extending through said top layer;
a second cut extending through said top layer, said liner, and said base layer; and
a third cut extending through said liner and said base layer.

9. The assembly as set forth in claim 1 further comprising a plurality of tamper-evident elements defined in said top layer of said primary label.

10. The assembly as set forth in claim 9 wherein said tamper-evident elements are defined by a plurality of cut lines extending through said top layer with said elements remaining attached to said liner when said top layer is at least partially removed from said liner.

11. The assembly as set forth in claim 1 wherein said releasable coating of said base layer is further defined as a silicone coating for facilitating removal of said liner from said base layer.

12. The assembly as set forth in claim 1 wherein said releasable coating of said liner is further defined as a silicone coating for facilitating removal of said top layer from said liner.

13. The assembly as set forth in claim 1 wherein said primary label is one of a plurality of primary labels with each of said primary labels having a respective one of said top layer and a respective one of said liner, and each of said primary labels sharing said base layer.

14. A method of labeling a surface utilizing an assembly including a base layer of material having an inner surface, and outer surface, and a releasable coating on the inner surface, a top layer of material spaced from the base layer and having an interior surface and an exterior surface, a top layer adhesive disposed on the interior surface of the top layer, a liner sandwiched between the top and base layers with the liner having first and second opposed surfaces with the first surface facing the interior surface of the top layer and the second surface facing the inner surface of the base layer and the liner having a releasable coating on the first surface, and a liner adhesive disposed on the second surface of the liner with the top layer, the liner, and a portion of the base layer collectively defining a primary label having a body section defined by a portion of the top layer and a portion of the liner and a tab section defined by a remaining portion of the top layer, a remaining portion of the liner, and a portion of the base layer covering the liner adhesive of the remaining portion of the liner, said method comprising the steps of:
removing a remaining portion of the base layer to expose the liner adhesive of the portion of the liner of the primary label; and
attaching the primary label to the surface.

15. The method as set forth in claim 14 wherein the step of attaching the primary label to the surface includes adhering the portion of the liner of the primary label to the surface.

16. The method as set forth in claim 15 wherein the assembly further includes a secondary label carried by the primary label with the secondary label defining a middle section of the body section and including the tab section, and the method further comprises the steps of:
removing the secondary label from the primary label to expose the top layer adhesive of the middle section of the secondary label; and
attaching the secondary label to another surface.

17. The method as set forth in claim 16 wherein the step of removing the secondary label includes:
grasping the tab section of the secondary label; and
peeling the secondary label from the primary label.

* * * * *